Aug. 30, 1966
O. L. STEELE, JR., ET AL
3,269,210
COMBINED STEERING WHEEL AND INSTRUMENT
PANEL MOUNTING FOR BOATS
Filed Aug. 28, 1964
4 Sheets-Sheet 1
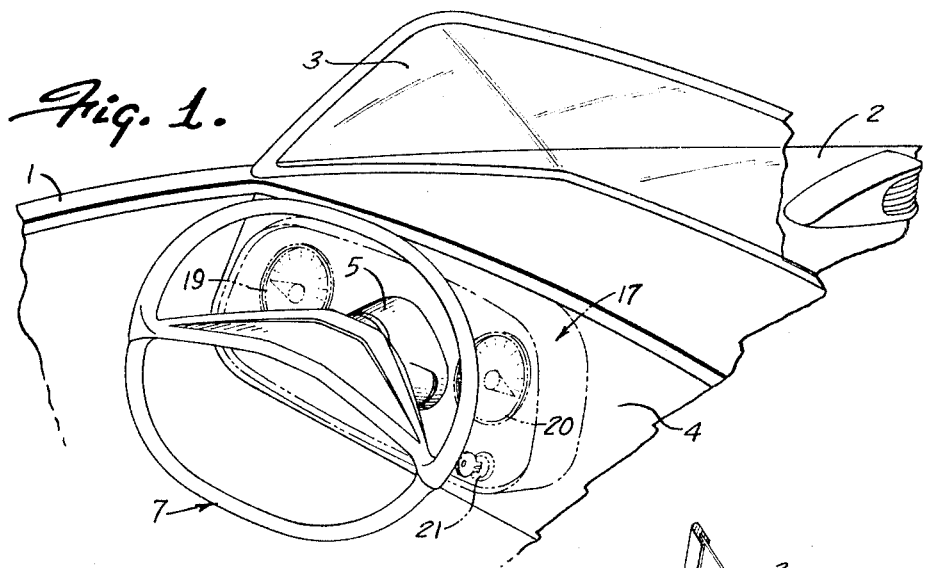
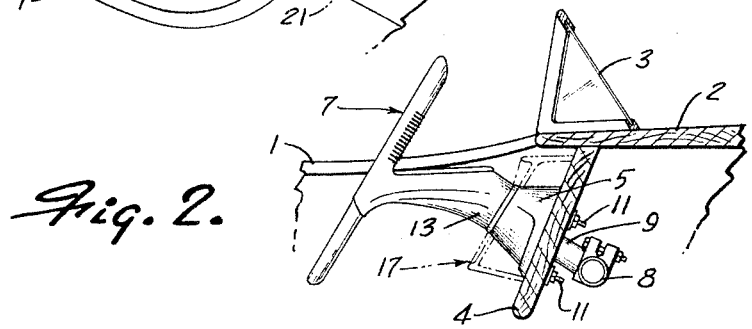
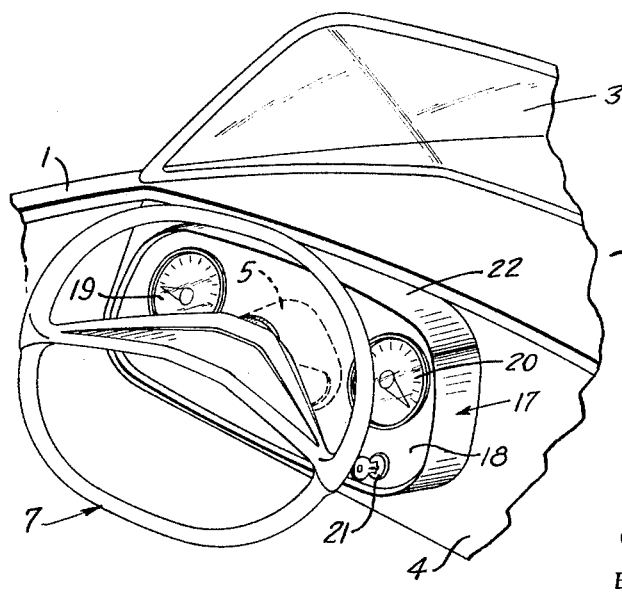
INVENTORS.
OWEN L. STEELE, JR.
ARTHUR F. MILLER
BY
Andrus & Starke
ATTORNEYS

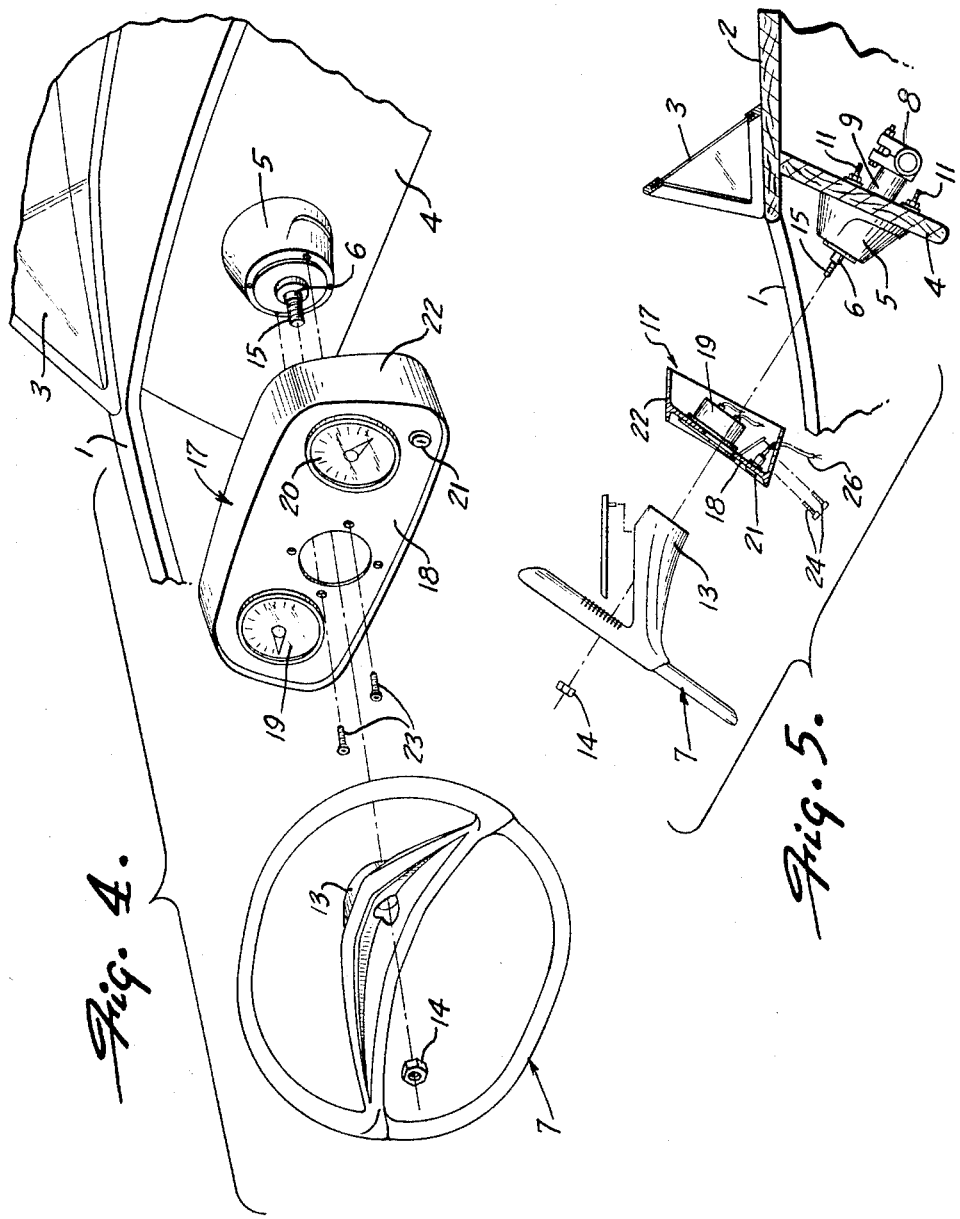

INVENTORS.
OWEN L. STEELE, JR.
ARTHUR F. MILLER
BY
Andrus & Starke
ATTORNEYS

Aug. 30, 1966    O. L. STEELE, JR., ETAL    3,269,210
COMBINED STEERING WHEEL AND INSTRUMENT
PANEL MOUNTING FOR BOATS
Filed Aug. 28, 1964    4 Sheets-Sheet 4

INVENTORS.
OWEN L. STEELE, JR.
ARTHUR F. MILLER
BY
Andrus & Starke
ATTORNEYS

3,269,210
COMBINED STEERING WHEEL AND INSTRUMENT PANEL MOUNTING FOR BOATS

Owen L. Steele, Jr., Fond du Lac, and Arthur F. Miller, Oshkosh, Wis., assignors to Kiekhaefer Corporation, Fond du Lac, Wis., a corporation of Delaware
Filed Aug. 28, 1964, Ser. No. 392,785
4 Claims. (Cl. 74—492)

This invention relates to a combined steering wheel and instrument panel mounting for boats.

In constructions heretofore employed the instrument panel has been generally separate from the mounting for the steering wheel and generally flush with the dashboard of the boat with the instruments extending through separate openings in the dashboard. This construction requires a substantial time for installation with all connections to be made behind the dashboard so that servicing is difficult.

The present invention provides an instrument panel that is raised from the dashboard with the instruments contained between the face of the panel and the dashboard and which is removable to provide ready access for servicing.

The instrument panel of the present invention is further designed to be mounted along with the steering wheel mounting so that no additional openings need be provided in the dashboard and the steering wheel mounting may be strengthened by the panel mounting and the whole may strengthen the dashboard.

In carrying out the invention the instrument panel is designed to receive the steering wheel mounting therethrough with the several instruments disposed generally on opposite sides of the steering wheel mounting. The outer edge of the instrument panel is flanged inwardly to engage the dashboard and thereby enclose the space between the panel and the dashboard and protect the instruments.

The instrument panel is secured to the mounting for the steering wheel and thereby strengthens the latter and the surrounding dashboard.

The accompanying drawings illustrate the best mode presently contemplated for carrying out the invention.

In the drawings:

FIGURE 1 is a perspective view of a portion of a boat showing the mounting of the steering wheel on the dashboard and with the instrument panel indicated in phantom;

FIG. 2 is a broken vertical section of the dashboard and windshield showing the steering wheel mounting in side elevation and again with the instrument panel in phantom;

FIG. 3 is a perspective similar to FIG. 1 showing the instrument panel in place;

FIG. 4 is a perspective exploded view of the combined mounting showing one manner of securing the instrument panel upon the steering wheel mounting;

FIG. 5 is a side elevational exploded perspective view of the combined mounting showing another manner of securing the instrument panel upon the steering wheel mounting;

The construction of FIGS. 1 to 7, inclusive, provides for mounting the instrument panels upon the steering wheel mounting hub after the latter is in place, and thus constitutes an instrument panel accessory that can be installed upon boats having the steering wheel assembly shown.

Figure 9:
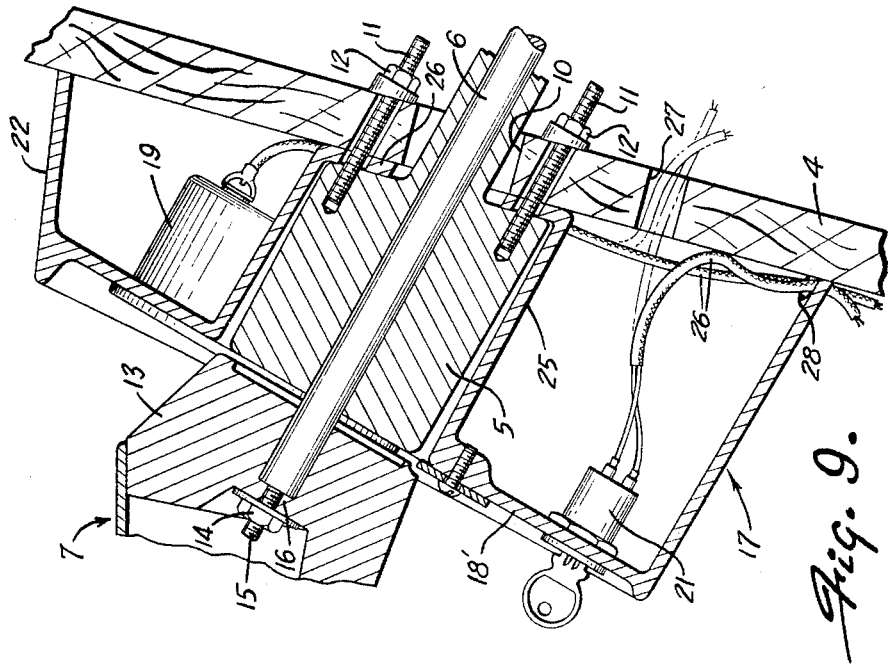
FIG. 9 is a generally vertical central section of the combined mounting of FIG. 8.
Figure 8:
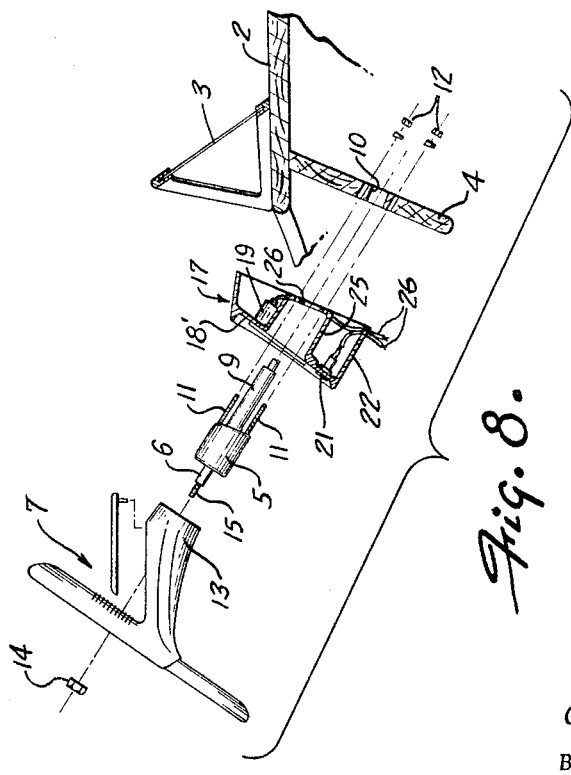
FIG. 8 is an exploded view of the combined mounting of a modified construction wherein the instrument panel has a flange portion secured between the steering wheel mounting and the dashboard.

The construction of FIGS. 8 and 9 is generally employed where the instrument panel and steering wheel are installed together upon a boat.

In the drawing the boat may have a hull 1 with a front deck 2, windshield 3 and dashboard 4.

The steering mechanism mounted upon the dashboard 4 for remotely controlling the rudder or other steering device for the boat, comprises a mounting hub 5 in which the steering column or post 6 is rotatably disposed, and a steering wheel 7 fixed upon the upper end of the post 6 to rotate the latter.

The inner end of post 6 drives suitable mechanism 8 behind the dashboard 4 for transmitting the steering forces to the rudder or other steering device, not shown.

The hub 5 generally has a sleeve-like central journal portion 9 receiving the post 6 and extending freely through an opening 10 in the dashboard 4.

The hub 5 is secured to the dashboard 4 by a plurality of screws 11 extending freely through small holes in the dashboard and threaded into the hub 5 with suitable nuts 12 threaded onto the inner ends of the corresponding screws and tightened against the back of the dashboard.

The steering wheel 7 has a central hub 13 which is secured upon the outer end of post 6 by means of the nut 14 on the reduced threaded end portion 15 of the post. The hub 13 is held free of contact with the outer end of hub 5 by reason of the flange 16 supporting hub 13 on the post 6.

In carrying out the invention an instrument panel 17 is provided which is adapted to surround hub 5 and to strengthen the dashboard and hub mounting. The panel 17 illustrated is a cast or molded unit with a front plate 18 in which suitable instruments 19 and 20 and an ignition key operated switch 21 are mounted.

The outer border of plate 18 merges into a flange or skirt 22 which extends to the dashboard 4 all around the panel and supports plate 18 spaced from the dashboard to accommodate the body of instruments 19 and 20 and of switch 21 therebetween. Upon securement of panel 17 to the hub 5 the skirt 22 presses against the dashboard 4 and generally braces the steering hub against lateral pressures from manual contact with and operation of the steering wheel. The panel 17 may be secured to hub 5 in various ways.

Figure 6:
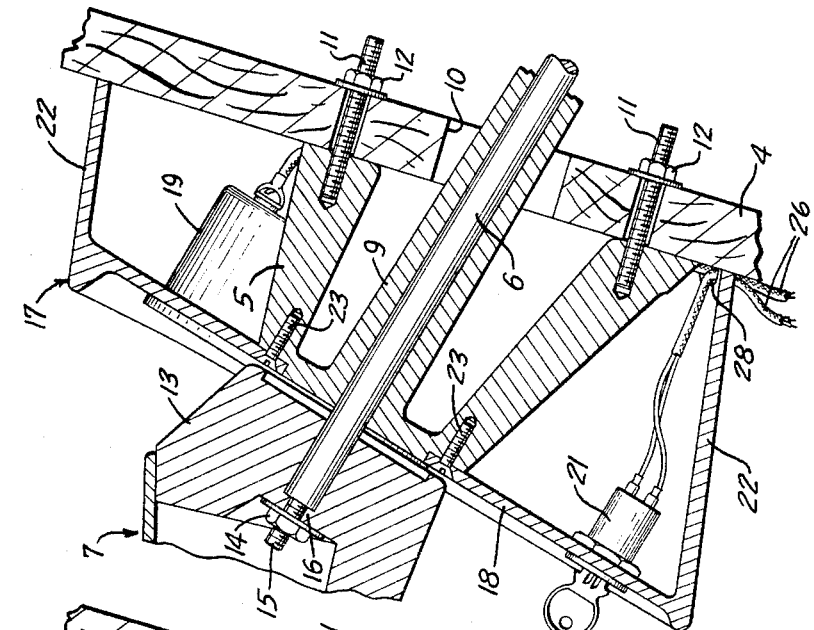
FIG. 6 is a generally vertical central section of the combined mounting of FIG. 4.

In FIG. 6 the plate 18 is shown as having an opening for receiving hub 5 and whereby the plate overlies a recessed portion of the hub and is secured thereto by screws 23.

Figure 7:
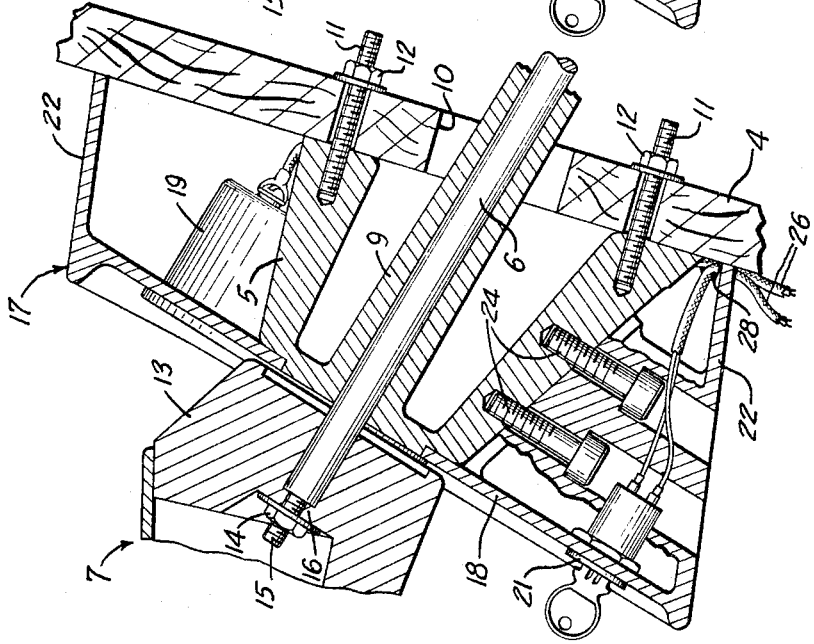
FIG. 7 is a generally vertical central section of the combined mounting of FIG. 5.

In FIG. 7 two lag screws 24 extend into hub 5 from recessed portions of the skirt 22 at the bottom of the panel 17, to thereby secure the panel to the hub.

In FIG. 9 the plate 18' of the panel is constructed with a cup-shaped flange 25 which receives hub 5 and which has a portion 26 extending between the hub and the dashboard 4 and through which screws 11 pass so that the panel is secured by the same screws that secure the hub 5 to the dashboard 4. In this construction the panel 17 substantially strengthens the dashboard in the region of the opening 10 and the steering wheel.

Installation of the panel 17 of FIGS. 4 to 7 is generally accomplished by merely removing nut 14 from the end of post 6, removing steering wheel 7, positioning panel 17, applying screws 23 or 24, as the case may be, repositioning steering wheel 7 and applying nut 14.

Installation of the panel 17 of FIGS. 8 to 9 should be made prior to installation of hub 5.

The instruments 19 and 20 and the switch 21 will normally require electrical or other connections for operation, in which case the wiring 26 or other connection can readily extend through opening 10, or through a separate opening 27 in the dashboard 4 or an opening 28 in the base of skirt 22.

The instruments and switch are protected by substantially full enclosure between the panel and the dash. Servicing of the instruments may be by individual removal from plate 18 or by removal of panel 17 as a whole.

Various modes of carrying out the invention are contemplated as being within the scope of the following claims particularly pointing out and distinctly claiming the subject matter which is regarded as the invention.

We claim:

1. In a device of the class described having a steering post carrying a steering wheel and journaled in a hub secured to the dash of a boat or the like, an instrument panel surrounding the hub and comprising a front plate carrying instruments for observation by the operator of the steering wheel, a skirt at the outer edge of said front plate and engaging with the dash to space the plate from the dash and provide an enclosure for the instruments, and means securing said plate to the hub.

2. The construction of claim 1 in which said plate overlies a recessed portion of the hub, and said securing means comprises a series of screws extending through the overlying portion of said plate and into the hub.

3. The construction of claim 1 in which said securing means comprises at least one lag screw through the skirt and into the hub from beneath the panel.

4. The construction of claim 1 in which said plate has a cup-shaped flange for receiving the hub and providing a flange portion extending inwardly between the hub and the dash, and a series of screws simultaneously secures the hub and panel to the dash.

References Cited by the Examiner

UNITED STATES PATENTS

| | | | |
|---|---|---|---|
| 1,722,565 | 8/1928 | Dunn | 180—90 |
| 2,765,863 | 2/1952 | Barenyi | 180—90 |

FOREIGN PATENTS 602,971  6/1948  Great Britain.

FRED C. MATTERN, JR., *Primary Examiner.*

J. D. PUFFER, *Assistant Examiner.*